(12) United States Patent
Engelstad et al.

(10) Patent No.: US 8,529,126 B2
(45) Date of Patent: Sep. 10, 2013

(54) ONLINE CALIBRATION OF A TEMPERATURE MEASUREMENT POINT

(75) Inventors: Loren Michael Engelstad, Norwood, MN (US); Dirk Willy Bauschke, Shakopee, MN (US); Jason Harold Rud, Mayer, MN (US)

(73) Assignee: Rosemount Inc., Chanhassen, MN (US)

( * ) Notice: Subject to any disclaimer, the term of this patent is extended or adjusted under 35 U.S.C. 154(b) by 1006 days.

(21) Appl. No.: 12/456,072

(22) Filed: Jun. 11, 2009

(65) Prior Publication Data

US 2010/0316086 A1   Dec. 16, 2010

(51) Int. Cl.
*G01K 15/00* (2006.01)
*G01K 1/14* (2006.01)
*G01K 7/21* (2006.01)

(52) U.S. Cl.
USPC ............... 374/163; 374/185; 374/208; 374/1

(58) Field of Classification Search
USPC ............ 374/1, 2, 100, 163, 139, 141, 179, 374/185, 208, 110, 129; 702/130, 131, 99; 73/866.5
See application file for complete search history.

(56) References Cited

U.S. PATENT DOCUMENTS

| | | | |
|---|---|---|---|
| 3,366,942 A * | 1/1968 | Deane | 340/608 |
| 4,552,465 A | 11/1985 | Anderson | |
| 4,590,326 A | 5/1986 | Woldy et al. | |
| 4,643,586 A * | 2/1987 | Hansen | 374/1 |
| 4,761,539 A * | 8/1988 | Carmean | 219/497 |
| 4,778,538 A * | 10/1988 | Lyman | 136/230 |
| 4,859,076 A | 8/1989 | Twerdochlib | |
| 4,901,061 A * | 2/1990 | Twerdochlib | 340/604 |
| 5,285,396 A * | 2/1994 | Aoyama | 702/135 |
| 5,669,713 A | 9/1997 | Schwartz et al. | |
| 5,700,090 A | 12/1997 | Eryurek | |
| 5,719,378 A | 2/1998 | Jackson, Jr. et al. | |
| 5,743,644 A * | 4/1998 | Kobayashi et al. | 374/126 |
| 5,746,511 A | 5/1998 | Eryurek et al. | |
| 5,829,876 A | 11/1998 | Schwartz et al. | |
| 5,961,215 A | 10/1999 | Lee | |
| 6,045,260 A * | 4/2000 | Schwartz et al. | 374/183 |
| 6,045,261 A | 4/2000 | Rossum et al. | |
| 6,155,712 A * | 12/2000 | Egawa | 374/126 |
| 6,220,748 B1 * | 4/2001 | Bates | 374/10 |
| 6,293,699 B1 | 9/2001 | Bailey et al. | |
| 6,473,710 B1 | 10/2002 | Eryurek | |

(Continued)

FOREIGN PATENT DOCUMENTS

JP   04326029 A   * 11/1992

OTHER PUBLICATIONS

Official International Search Report and Written Opinion of the Korean Intellectual Property Office in foreign counterpart Application No. PCT/US2010/001634, filed Jun. 4, 2010.

*Primary Examiner* — Gail Verbitsky
(74) *Attorney, Agent, or Firm* — Kinney & Lange, P.A.

(57) ABSTRACT

A system for measuring temperature includes a thermowell, a primary temperature sensor, a reference sensor, and a transmitter. The thermowell has a measurement instrument connection and a side port. The primary temperature sensor extends into the thermowell through the measurement instrument connection, and the reference sensor extends into the thermowell through the side port. The transmitter is connected to each of the primary temperature sensor and the reference sensor. The transmitter has circuitry for measuring temperature based upon signals received from the primary temperature sensor and for concurrently calibrating based upon signals received from the reference sensor.

8 Claims, 8 Drawing Sheets

(56) References Cited

U.S. PATENT DOCUMENTS

| | | |
|---|---|---|
| 6,485,175 B1 | 11/2002 | Nimberger et al. |
| 6,519,546 B1 | 2/2003 | Eryurek et al. |
| 7,111,982 B1 | 9/2006 | Swonger, Jr. |
| 7,128,466 B2 * | 10/2006 | Chang et al. ............. 374/141 |
| 7,789,559 B2 * | 9/2010 | Waser et al. ............. 374/179 |
| 8,011,827 B1 * | 9/2011 | Djeu ............. 374/161 |
| 8,038,345 B2 * | 10/2011 | Stoll et al. ............. 374/143 |
| 2007/0206653 A1 * | 9/2007 | Nakano et al. ............. 374/1 |
| 2009/0110023 A1 | 4/2009 | Clark, Jr. et al. |
| 2009/0201968 A1 * | 8/2009 | Schulze ............. 374/1 |

* cited by examiner

ONLINE CALIBRATION OF A TEMPERATURE MEASUREMENT POINT

BACKGROUND

The present invention relates to temperature measurement, and in particular, to calibration of temperature measurement points.

Temperature measurement points are used in the process control industry to sense the temperature of a process fluid, for example. A temperature measurement point typically includes a temperature sensor connected to a transmitter. The transmitter is often located in a remote location and may be coupled to a control room over a 4-20 mA current loop, a digital communication bus, or a wireless network. The temperature sensor is placed in thermal contact with the process fluid and provides an output related to temperature of the process fluid. The temperature sensor, for example, may be a resistance temperature detector (RTD) which is a device having a temperature dependent resistance or a thermocouple which is a device producing a temperature dependent voltage. For a typical RTD, the transmitter injects a current into the RTD, and the resultant voltage across the RTD is used to measure resistance. The voltage is converted into a digital format using an analog-to-digital converter and provided to measurement circuitry in the transmitter. The measurement circuitry converts the measured voltage into a digital value representative of temperature.

In some cases, the process fluid may be an environment that is hazardous to the temperature sensor. In such situations, the temperature sensor is inserted into a thermowell, which is inserted into the process fluid. Thermowells are typically long, slender tubes or wells, open at one end to allow insertion of the temperature sensor and closed at the tip end to protect the temperature sensor from having direct contact with the process fluid.

Even when a thermowell is used, the relationship between resistance of an RTD and temperature tends to change over time. These changes can be periodically calibrated out of the system to maintain accuracy of the temperature measurement. For example, periodically an operator (or user) may be required to journey into the field to calibrate the temperature sensor. The temperature sensor is calibrated by taking it to a laboratory, placing the RTD sensor in a bath of a known temperature, and monitoring the measured temperature output from a calibrated meter. The difference between the actual temperature of the temperature bath and the measured temperature output is used as a calibration factor, entered into memory of the transmitter, and stored for subsequent use by the measurement circuitry. Similar calibration is performed for thermocouples and other temperature sensors.

Much like the temperature sensor, accuracy of the transmitter can also change over time. The transmitter is typically calibrated by disconnecting it from the temperature sensor and connecting it to a reference calibration tool. The reference calibration tool typically produces a known electrical parameter, such as resistance. The difference between the expected resistance and the measured resistance is used as a calibration factor and stored in memory for subsequent use by the measurement circuitry.

Unfortunately, these calibration techniques can be time consuming. Moreover, such calibration requires the transmitter to be offline for a period of time, not measuring the process fluid. In certain situations, the entire process is shut down until all temperature measurement points are back on line. Thus, calibration can be expensive, discouraging users from calibrating temperature measurement points as often as they should.

SUMMARY

According to the present invention, a system for measuring temperature includes a thermowell, a primary temperature sensor, a reference sensor, and a transmitter. The thermowell has a measurement instrument connection and a side port. The primary temperature sensor extends into the thermowell through the measurement instrument connection, and the reference sensor extends into the thermowell through the side port. The transmitter is connected to each of the primary temperature sensor and the reference sensor. The transmitter has circuitry for measuring temperature based upon signals received from the primary temperature sensor and for concurrently calibrating based upon signals received from the reference sensor.

Another embodiment includes a method for calibrating a transmitter with measurement circuitry electrically connected to first and second input terminals. The method includes connecting a primary temperature sensor to the first input terminal, connecting a calibrated reference device to the second input terminal, and calibrating the measurement circuitry with respect to the first input terminal according to signals received from the second input terminal while measuring temperature according to signals received from the first input terminal.

In yet another embodiment, a temperature transmitter includes first and second input terminals, a multiplexer, an analog-to-digital converter, and a microprocessor. The multiplexer has first and second channels electrically connected to each of the first and second input terminals, respectively. The analog-to-digital converter is electrically connected to the multiplexer and to the microprocessor. The microprocessor is configured to calculate a first temperature value based upon signals received from the first channel, while concurrently calibrating measurement programming for the first channel in the microprocessor according to signals received from the second channel.

In yet another embodiment, a thermowell includes a well, with an exterior surface and an interior surface, and a bore cavity defined by the interior surface. The bore cavity extends from a measurement instrument connection at a proximal end of the well to a sealed tip at a distal end of the well. A connection portion is located on the exterior surface between the proximal end and the distal end. A side passage extends from an exterior side port on the exterior surface of the well to an interior side port on the interior surface of the well. The interior side port is between the proximal and distal ends of the well, and the exterior side port is between the proximal end of the well and the connection portion. The proximal end of the well is nearer to the exterior side port than to the interior side port.

DETAILED DESCRIPTION

In general, the present invention provides an apparatus and a method for calibrating a temperature measurement point. A transmitter is configured to be capable of calibration according to one channel while continuing to measure temperature with another channel. A thermowell has a bore cavity configured to allow insertion of a temperature sensor and a side passage configured to allow insertion of a reference device, where the reference device rests adjacent to the temperature sensor for calibration. Various methods allow for calibration of the transmitter, the temperature sensor, or both. In each of the various methods, the temperature sensor remains connected to the transmitter, the temperature sensor remains located in the thermowell, or both.

Figure 1:
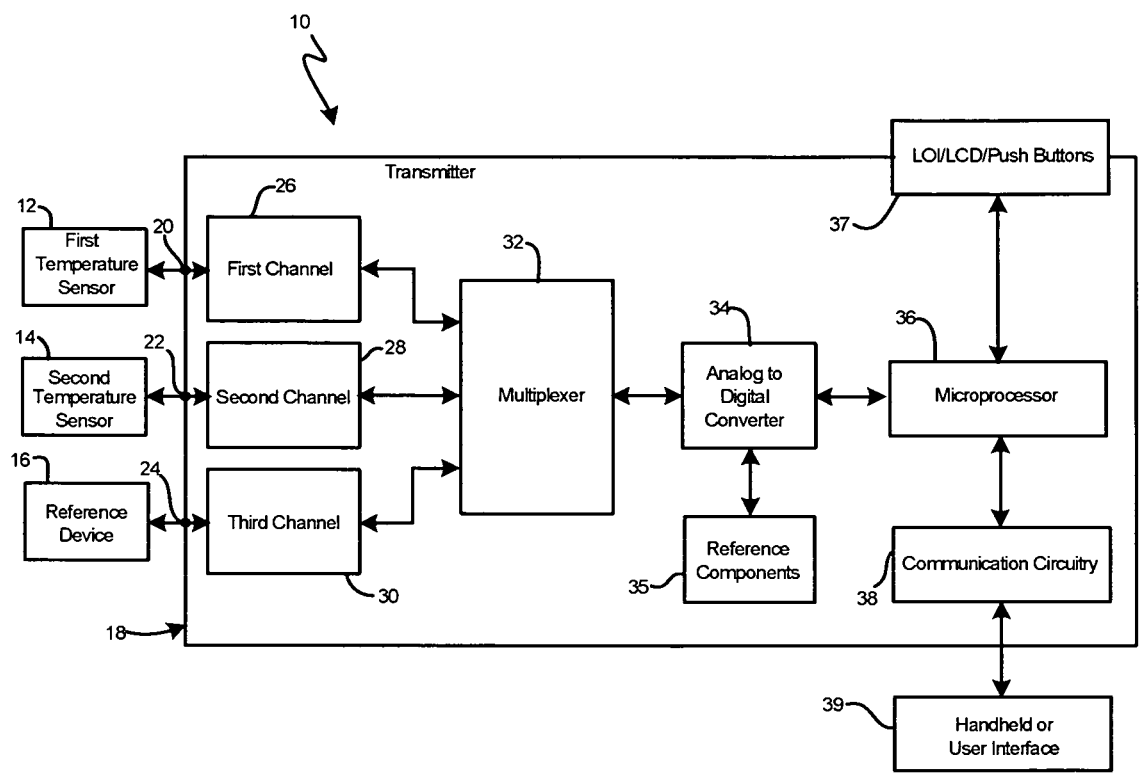
FIG. 1 is a schematic view of a temperature measurement point.

FIG. 1 is a schematic view of temperature measurement point 10. Temperature measurement point 10 includes first temperature sensor 12, second temperature sensor 14, reference device 16, and transmitter 18. Transmitter 18 includes first input terminal 20, second input terminal 22, third input terminal 24, first channel 26, second channel 28, third channel 30, multiplexer 32, analog-to-digital (A/D) converter 34, reference components 35, microprocessor 36, local operator interface (LOI) 37, communication circuitry 38, and remote user interface 39.

First and second temperature sensors 12 and 14 can be virtually any of a variety of temperature sensors configured to electronically measure temperature, such as a resistance temperature detector (RTD) or a thermocouple. Reference device 16 can be a reference sensor, such as virtually any of a variety of temperature sensors configured to electronically measure temperature. Reference device 16 can be calibrated independently of, and prior to connecting to, temperature measurement point 10. In another embodiment, reference device 16 can be a reference calibration tool that generates a measureable electrical parameter with a predetermined value. For example, reference device 16 can generate a predetermined electrical resistance in order to simulate a particular type of RTD measuring a specific temperature. Alternatively, reference device 16 can generate a predetermined voltage in order to simulate a particular type of thermocouple measuring a specific temperature. Such reference calibration tools are said to simulate a sensor and are often referred to as a sensor simulator.

First temperature sensor 12, second temperature sensor 14, and reference device 16 connect to transmitter 18 at first input terminal 20, second input terminal 22, and third input terminal 24, respectively. First input terminal 20, second input terminal 22, and third input terminal 24 connect first temperature sensor 12, second temperature sensor 14, and reference device 16 to first channel 26, second channel 28, and third channel 30, respectively. In various embodiments, temperature measurement point 10 can include more or less temperature sensors, terminals, and channels than in the illustrated embodiment. Multiplexer 32 receives analog signals from each of first channel 26, second channel 28, and third channel 30 and outputs the signals on a single line to A/D converter 34.

Transmitter 18 includes measurement circuitry and calibration circuitry for processing signals from multiplexer 32. In the illustrated embodiment, A/D converter 34, reference components 35, and microprocessor 36 combine to function as both the measurement circuitry and the calibration circuitry. Reference components 35 can comprise a voltage source or a resistor to provide a relatively predictable reference measurement to improve accuracy of measurements from each of first channel 26, second channel 28, and third channel 30. A/D converter 34 converts analog signals received from multiplexer 32 and from reference components 35 into digital signals and provides the digital signals to microprocessor 36. Microprocessor 36 can be programmed with firmware for operating transmitter 18. The firmware can include measurement programming for calculating temperature values based upon the digital signals received from A/D converter 34.

Microprocessor 36 can be electrically connected to local operator interface (LOI) 37 and have device description software for communication with an operator (or user). LOI 37 allows the operator to monitor and control operation of temperature measurement point 10. For example, an operator can monitor temperature of a process as measured at process locations of each of first and second temperature sensors 12 and 14. In one embodiment, LOI 37 can comprise a liquid crystal display (LCD) screen for displaying information from microprocessor 36 and a set of push buttons for inputting information to microprocessor 36. LOI 37 can be located directly on transmitter 18. Microprocessor 36 can also be connected to remote user interface 39 via communication circuitry 38. Transmitter 18 can be connected to remote user interface 39 via a wireless or a wired connection and communicate with standard communication protocol such as HART or Foundation Fieldbus. Remote user interface 39 can also allow a user to monitor and control operation of temperature measurement point 10. In one embodiment, remote user interface 39 can be a handheld device. In another embodiment, remote user interface 39 can be a remotely located control room, which receives regular temperature information from transmitter 18. Many functions for transmitting information to and receiving information from transmitter 18 can be performed by either LOI 37 or remote user interface 39 or both. Consequently, LOI 37 and remote user interface 39 will be collectively referred to as a user interface, herein, for simplicity.

Accuracy of temperature measurement point 10 depends, in large part, on the function of microprocessor 36. Microprocessor 36 must accurately translate signals from first and second temperature sensors 12 and 14 into corresponding temperature equivalents. For example, if first temperature sensor 12 is an RTD, microprocessor 36 calculates temperature under the assumption that first temperature sensor 12 produces a particular resistance when exposed to a particular temperature. If that assumption is true, then microprocessor 36 can accurately calculate the particular temperature based upon an input of the particular resistance. Microprocessor 36 compares the input received from first temperature sensor 12 to signals received from reference components 35 to improve accuracy of its calculation of the particular temperature. However, if characteristics of first temperature sensor 12 have changed over time, it will no longer produce the correct resistance. Consequently, first temperature sensor 12 can require calibration. When first temperature sensor 12 is calibrated, no actual changes are made to first temperature sensor 12. Instead, the changed characteristics of first temperature sensor 12 are measured, and coefficients used in the measurement programming in microprocessor 36 are changed to calculate temperature based upon the new characteristics of first temperature sensor 12.

Similarly, when transmitter 18 requires calibration, changed characteristics of transmitter 18 are derived, and coefficients used in the measurement programming in microprocessor 36 are changed to calculate temperature based upon the new characteristics of transmitter 18. Temperature sensors 12 and 14, transmitter 18, or all of temperature measurement point 10 can be calibrated by methods described, below, with reference to FIGS. 3-7.

FIG. 2 is a side elevation view of thermowell 40, which includes well 42, exterior surface 44, interior surface 46, bore cavity 48, proximal end 50, distal end 52, measurement instrument connection 54, thermowell tip 56, instrument connection threads 58, flange 60, non-process side 62, process side 64, raised face 66, non-wetted portion 68, side passage 70, exterior side port 72, interior side port 74, side passage threads 75, and plug 76. Well 42 comprises exterior surface 44 on the outside and interior surface 46 on the inside. Well 42 is relatively long and slender, extending from proximal end 50 to distal end 52. Measurement instrument connection 54 is an opening located at proximal end 50 for allowing insertion of first temperature sensor 12 into bore cavity 48. In the illustrated embodiment, measurement instrument connection 54 has instrument connection threads 58 for attaching to transmitter 18 (shown in FIG. 1). In another embodiment, measurement instrument connection 54 is not threaded and need not connect directly to transmitter 18. Bore cavity 48 is a narrow, cylindrical passage extending nearly the entire length of thermowell 40. Bore cavity 48 is enclosed at distal end 52 by thermowell tip 56.

Flange 60 is a generally ring-shaped structure welded or otherwise fixed to exterior surface 44 of well 42. Flange 60 has non-process side 62 opposite of process side 64. Raised face 66 is on an inner diameter portion of process side 64 and non-wetted portion 68 is on an outer diameter portion of process side 64. When thermowell 40 is inserted into a process fluid through a process barrier, raised face 66 can compress a gasket (not shown) against a mating flange surface (not shown) to form a process seal.

Side passage 70 is a straight, narrow, cylindrical passage through well 42. Side passage 70 extends from exterior side port 72 at exterior surface 44 to interior side port 74 at interior surface 46. Side passage 70 is angled such that proximal end 50 is nearer to exterior side port 72 than to interior side port 74. Side passage 70 has side passage threads 75 near exterior side port 72 configured for screwing plug 76 into. Plug 76 can reduce flow of liquid and dust into bore cavity 48. In other embodiments, plug 76 can be virtually any sealing device capable of reducing flow through side passage 70, such as a cap.

In the illustrated embodiment, first resistance temperature detector (RTD) 78 is attached to a tip of first temperature sensor 12. First temperature sensor 12 can be inserted through measurement instrument connection 54, into bore cavity 48, to the end so that first RTD 78 is at distal end 52. Reference RTD 80 is attached to a tip of reference device 16. Reference device 16 can be inserted through exterior side port 72, through side passage 70, into bore cavity 48, to the end so that reference RTD 80 can be adjacent to first RTD 78. In one embodiment, reference device 16 could be as small as ½ millimeter in diameter, and side passage 70 would be at least ½ millimeter in diameter. Bore cavity 48 is sized to be large enough so that reference device 16 can be inserted into bore cavity 48 while first temperature sensor 12 is still there. In the illustrated embodiment, side passage 70 has a relatively steep angle allowing reference temperature sensor 16 to be inserted into bore cavity 48, while keeping bore cavity 48 relatively narrow. The angle of side passage 70 encourages reference device 16 to travel toward distal end 52 when inserted. Side passage 70 is angled with respect to bore cavity 48 with an angle greater than 0 degrees and less than 90 degrees.

In one embodiment, thermowell 40 can be machined from a solid piece of metal bar stock in order to create a relatively pressure resistant structure. In another embodiment, thermowell 40 can be a protection tube (also called a tubular thermowell), manufactured from a relatively inexpensive piece of metal tubing.

Figure 2A:
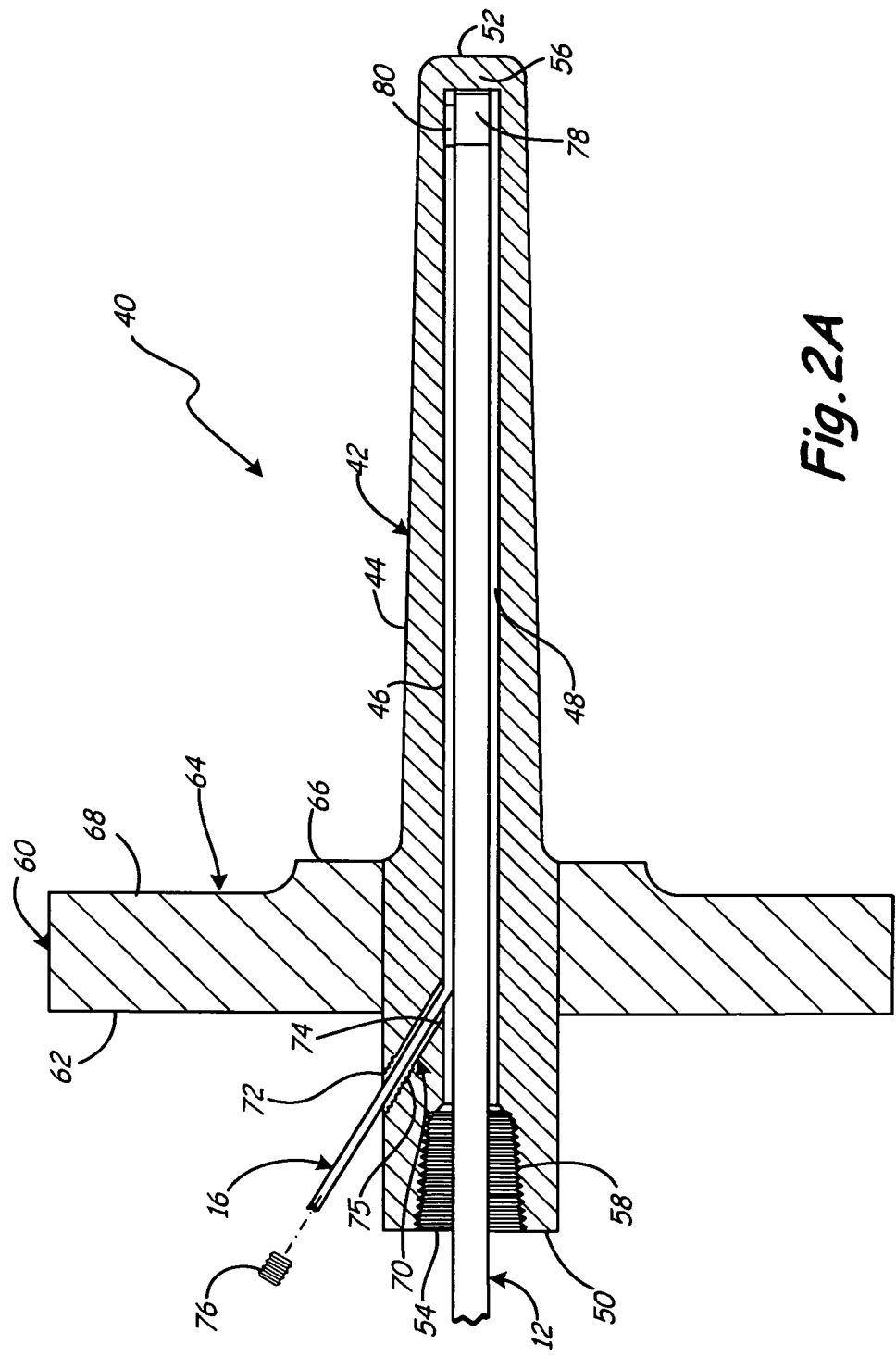
FIG. 2A is a side elevation view of a thermowell with a flange.
Figure 2B:
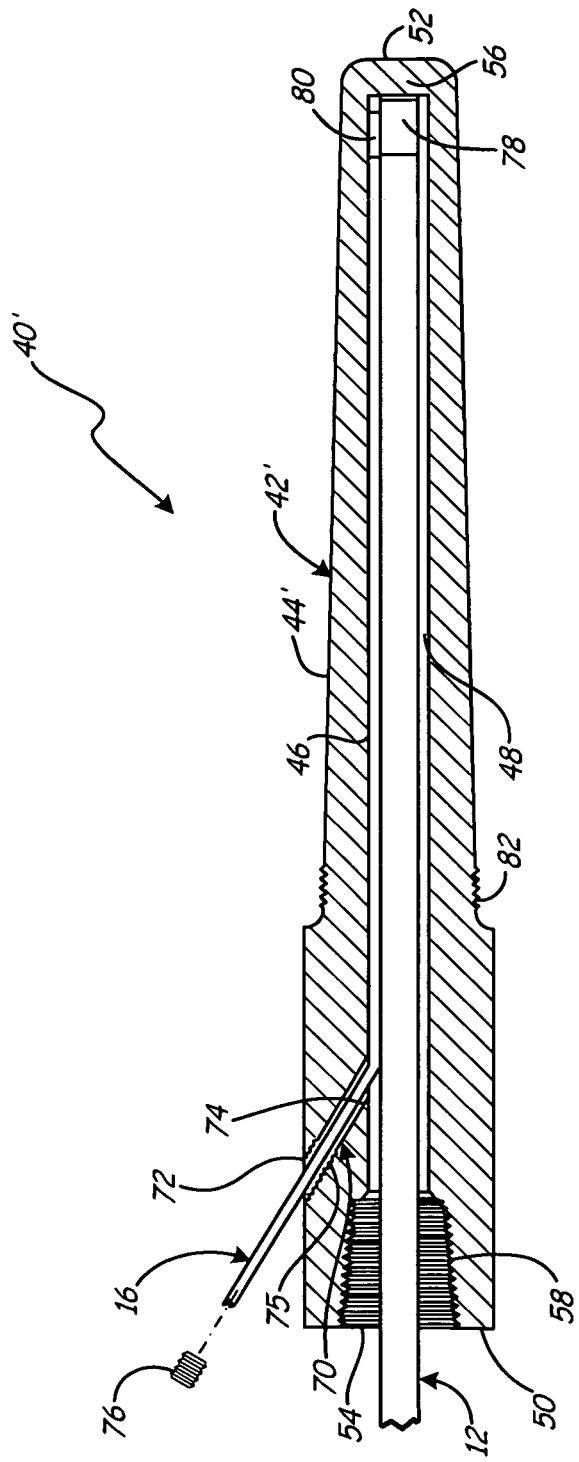
FIG. 2B is a side elevation view of a thermowell with process connection threads.

FIG. 2B is a side elevation view of thermowell 40' with process connection threads 82. Thermowell 40' as illustrated in FIG. 2B is substantially similar to thermowell 40 as illustrated in FIG. 2A except that thermowell 40' does not include a flange attached to well 42'. Instead, process connection threads 82 are on exterior surface 44' of well 42'. Process connection threads 82 are configured for threading into the process barrier (not shown).

Thermowells 40 and 40' can have one of a variety of connection portions for connecting to the process barrier (not shown) such as flange 60 as illustrated in FIG. 2A or process connection threads 82 as illustrated in FIG. 2B. In alternative embodiments, another type of connection portion can be used for connecting to the process barrier (not shown). In each of these embodiments, side passage 70 can be positioned between measurement instrument connection 54 and the connection portion. Such thermowells can be useful for calibrating a temperature measurement point by allowing reference device 16 to be close to first temperature sensor 12 without having to remove first temperature sensor 12 from the process. In another embodiment, reference device 16 need not be actually inserted into thermowell 40 or 40'. Instead, reference device 16 can be located within reasonable proximity to first temperature sensor 12 without a thermowell, so long as reference device 16 is exposed to a portion of the process with substantially the same temperature as the portion of the process to which reference device 16 is exposed.

Figure 3:
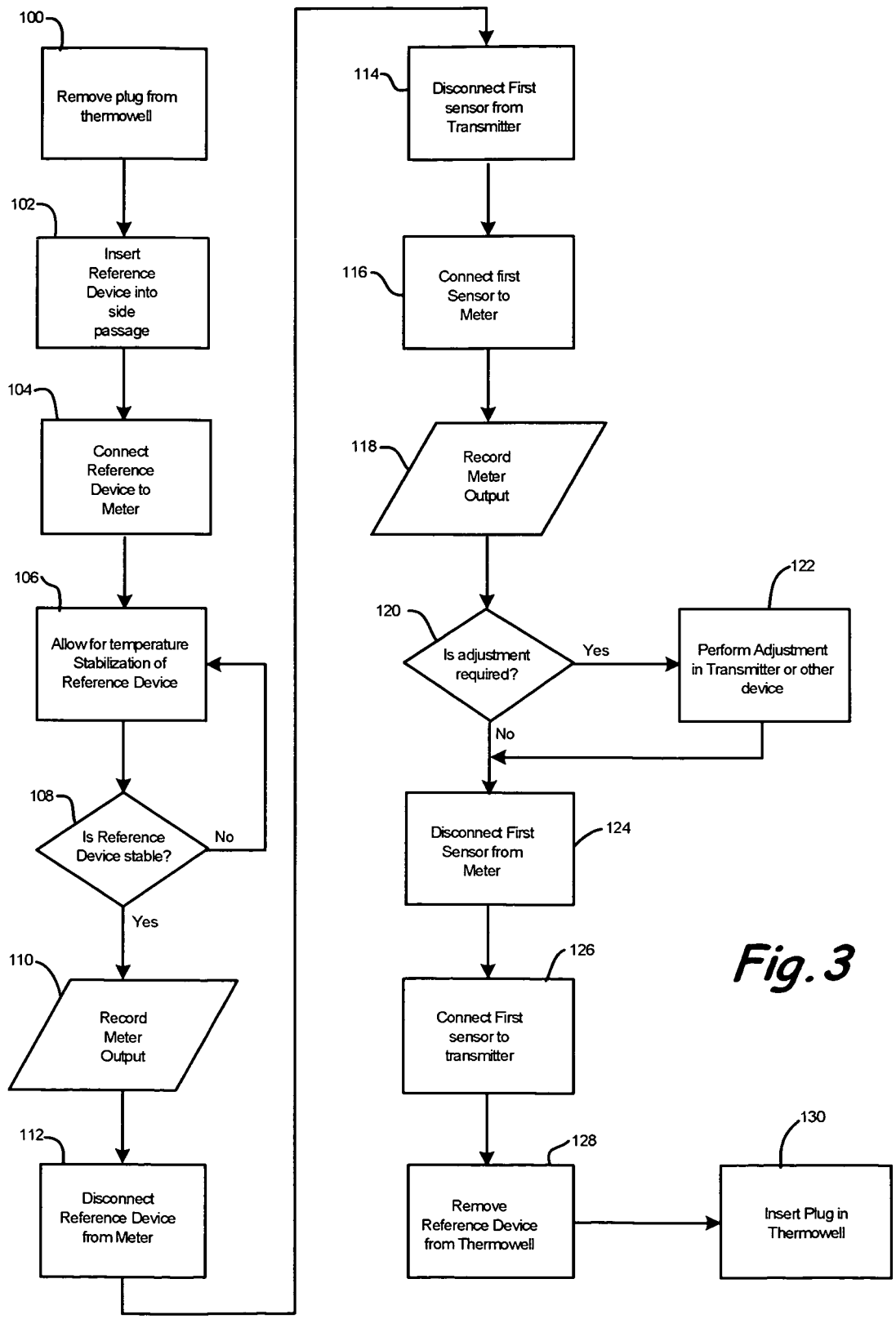
FIG. 3 is a flow chart of a first method of calibrating a temperature measurement point.

FIG. 3 is a flow chart of a first method of calibrating temperature measurement point 10. Prior to beginning the first method, reference device 16 would not yet be in thermowell 40 as depicted in FIG. 2. Instead, plug 76 would be plugging side passage 70. First temperature sensor 12 could already be inserted into thermowell 40 as depicted in FIG. 2 and transmitter 18 could be measuring temperature of a process as described with respect to FIG. 1. If first temperature sensor 12 is not already inserted into thermowell 40, it should be done in advance of step 108.

Upon starting the first method, plug 76 is removed from side passage 70 (step 100). Then reference device 16 is inserted into side passage 70 until reference RTD 80 is approximately adjacent to first RTD 78 (step 102). In the first method, reference device 16 is a calibrated temperature sensor, such as an RTD. Next, reference device 16 is connected to a calibrated external meter (step 104). The calibrated external meter, combined with reference device 16, measures temperature of the process at the location of thermowell 40. Then, the operator waits for temperature measured by reference device 16 to stabilize (step 106). If temperature measured by reference device 16 is not stable, then further waiting is required (step 108). If the temperature is stable, then the meter output from the calibrated external meter is recorded (step 110). The first method of calibrating temperature measurement point 10 benefits from a process with a steady state operation, where temperature does not substantially vary. This allows temperature measured at one point by reference device 16 to be compared to temperature measured by first temperature sensor 12 a few moments later.

After the meter output is recorded, reference device 16 is disconnected from the calibrated external meter (step 112). Then, first temperature sensor 12 is disconnected from transmitter 18 (step 114) and connected to the calibrated external meter (step 116). The meter output produced by first temperature sensor 12 connected to the calibrated external meter is then recorded (step 118). The meter output recorded from reference device 16 is then compared to the meter output recorded from first temperature sensor 12 to determine whether an adjustment is required (step 120). If the recorded outputs differ, then a calibration adjustment is performed in transmitter 18 to accurately reflect temperature measured by first temperature sensor 12 based upon newly found drift characteristics of first temperature sensor 12 (step 122). This adjustment can be performed via a user interface such as LOI 37 or remote user interface 39. For example, the adjustment can be entered using a handheld device through a junction box (not shown) attached to transmitter 18. This adjustment may be performed immediately at step 122 or at a later time.

Whether or not adjustment is required, first temperature sensor 12 is then disconnected from the calibrated external meter (step 124) and reconnected to transmitter 18 (step 126). Reference device 16 is removed from thermowell 40 (step 128). Finally, plug 76 is reinserted into side passage 70 (step 130). Calibration of temperature measurement point 10, according to the first method, is then complete.

Calibration according to the first method allows an operator to calibrate transmitter 18 to compensate for drift of first temperature sensor 12 without removing first temperature sensor 12 from thermowell 40. The first method could then be repeated for second temperature sensor 14 and any other sensors connected to transmitter 18.

If the operator desires to calibrate temperature measurement point 10 as a whole, the first method can be modified. Steps 112, 114, 116, and 118 can be omitted. Instead, first temperature sensor 12 can remain connected to transmitter 18 and the transmitter temperature output from first temperature sensor 12 can be recorded. Then, temperature measured from transmitter 18 can be compared to temperature measured by the calibrated external meter and reference device 16 at step 120. All remaining steps of the first method can remain unchanged.

Figure 4:
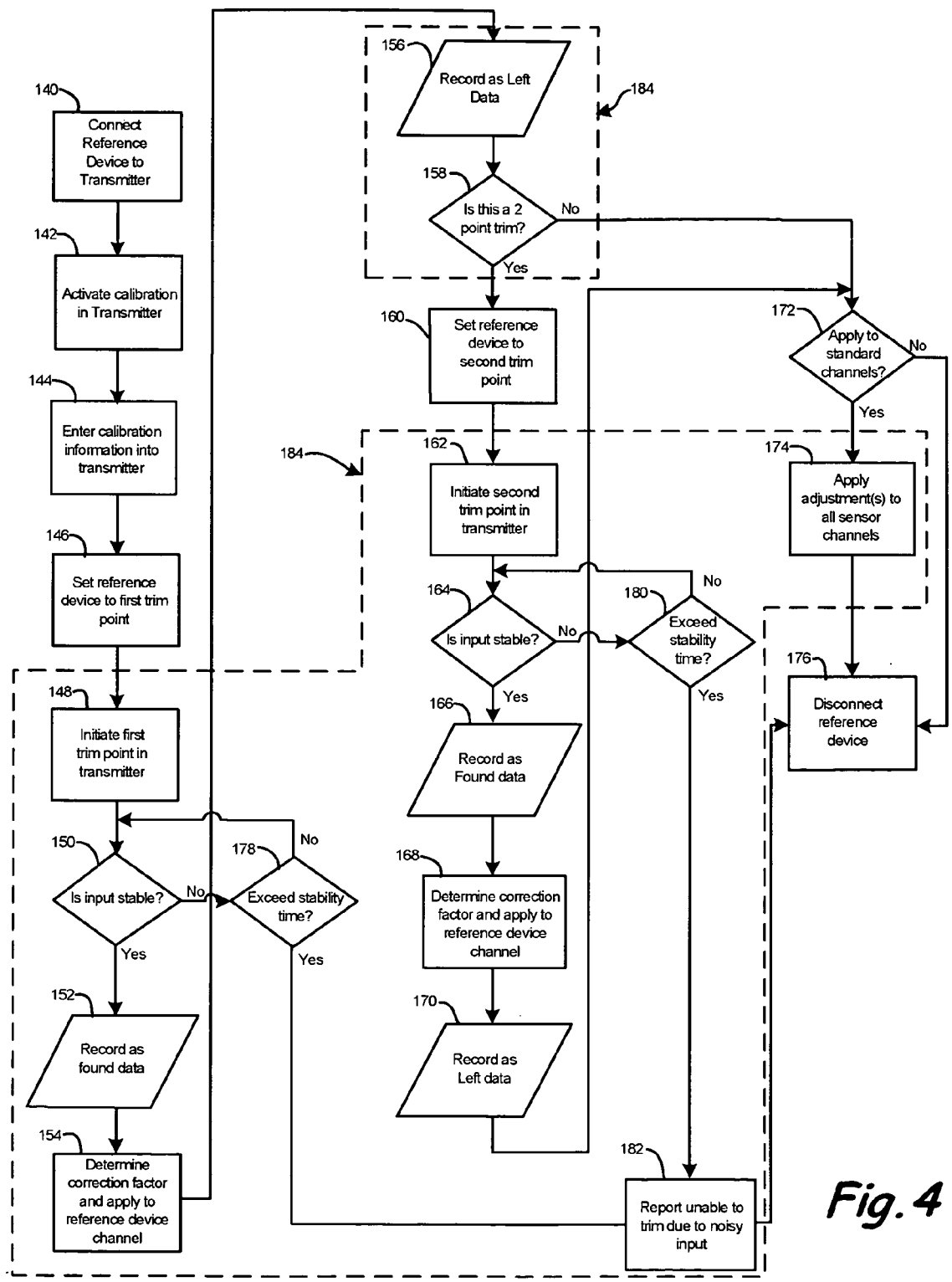
FIG. 4 is a flow chart of a second method of calibrating a temperature measurement point.

FIG. 4 is a flow chart of a second method of calibrating temperature measurement point 10. Prior to beginning the method, first temperature sensor 12 could already be inserted into thermowell 40 as depicted in FIG. 2 and transmitter 18 could be measuring temperature of a process as described with respect to FIG. 1. This is not, however, necessary for operation of the second method; rather, it is merely a convenience option for the operator.

Upon starting the second method, reference device 16 is connected to third input terminal 24 of transmitter 18 (step 140). In the second method, reference device 16 is a calibrated sensor simulator for generating a predetermined electrical parameter, such as resistance. Third input terminal 24 can be an unused terminal, dedicated for use as a connection for reference device 16. In an alternative embodiment, reference device 16 can be connected to any terminal of transmitter 18 that happens to be available.

Next, calibration mode is activated in transmitter 18 so that transmitter 18 is aware that third channel 30 will be providing calibration data as opposed to ordinary temperature data (step 142). Calibration information is then entered into transmitter 18 via a user interface (step 144). Calibration information includes the number of calibration points (also called trim points) that will be used in the calibration process as well as the actual calibration values (also called trim values) that will be used. For example, reference device 16 can be a sensor simulator that simulates an RTD sensor that produces trim values of 50 ohms and 100 ohms. The operator could enter a value of 50 ohms if only one trim point is being use or could enter values of 50 ohms and 100 ohms if two trim points are being used. Then, reference device 16 is set to the first trim point and produces a 50 ohm output (step 146). First trim point measurement is then initiated in transmitter 18 (step 148), which checks to see if input from reference device 16 is stable (step 150). If input is stable, transmitter 18 measures resistance of reference device 16 and records data for a current state of calibration as "As Found" data (step 152). Next, transmitter 18 determines a correction factor by comparing the actual trim value of 50 ohms to the measured trim value, which, may differ from 50 ohms. At this step, the correction factor is applied to third channel 30 only (step 154). After the correction factor is applied, data for the new calibration is recorded as "As Left" data (step 156).

Then transmitter 18 checks to see if it is performing a one trim point calibration or a two trim point calibration (step 158). If transmitter 18 is performing a two trim point calibration, then reference device 16 is set to the second trim point and produces a 100 ohm output (step 160). Second trim point measurement is then initiated in transmitter 18 (step 162), which checks to see if input from reference device 16 is stable (164). If input is stable, transmitter 18 records data for a current state of calibration as "As Found" data (step 166). Next, transmitter 18 determines a correction factor by comparing the actual trim value of 100 ohms to the measured trim value and applies the correction factor for the second trim point to third channel 30 only (step 168). After the correction factor is applied, data for the new calibration is recorded as "As Left" data (step 170). If transmitter 18 determines, at step 158, that it is performing a one trim point calibration, then steps 160 through 170 are omitted.

Then, the operator-decides whether to calibrate all channels according to the new calibration data measured with respect to third channel 30 (step 172). If the operator determines that the calibration is appropriate for all channels, such calibration is applied (step 174). Finally, reference device 16 is disconnected from third terminal 24 (step 176). If, however, the operator determines that calibration is not appropriate for all channels at step 172, then step 174 is not performed and the operator moves on to step 176.

In certain circumstances, input from reference device 16 may not be stable. If it is determined that input is not stable at either of step 150 or step 164, then transmitter 18 checks to see if a stability time limit has been exceeded (step 178 and step 180). The stability time limit is an amount of time that the system is allowed to stabilize before reporting an error. The stability time limit can be preprogrammed or inputted by the operator. If the stability time limit has not been exceeded, step 150 or step 164 is repeated. If the stability time limit has been exceeded, transmitter 18 then reports that it is unable to perform a trim due to noisy input (step 182) and reference device 16 is disconnected from third terminal 24 at step 176. Transmitter step group 184 includes those steps that are performed by circuitry inside transmitter 18.

Calibration according to the second method allows an operator to calibrate transmitter 18 to compensate for drift of transmitter 18 without disconnecting first temperature sensor 12 or second temperature sensor 14 from transmitter 18. In transmitters where multiple channels share common circuitry, as in FIG. 1, all channels can have a relatively accurate calibration by copying the calibration values determined with respect to one channel. This allows for continued measurement of the process by all measurement channels during calibration.

Figure 5:
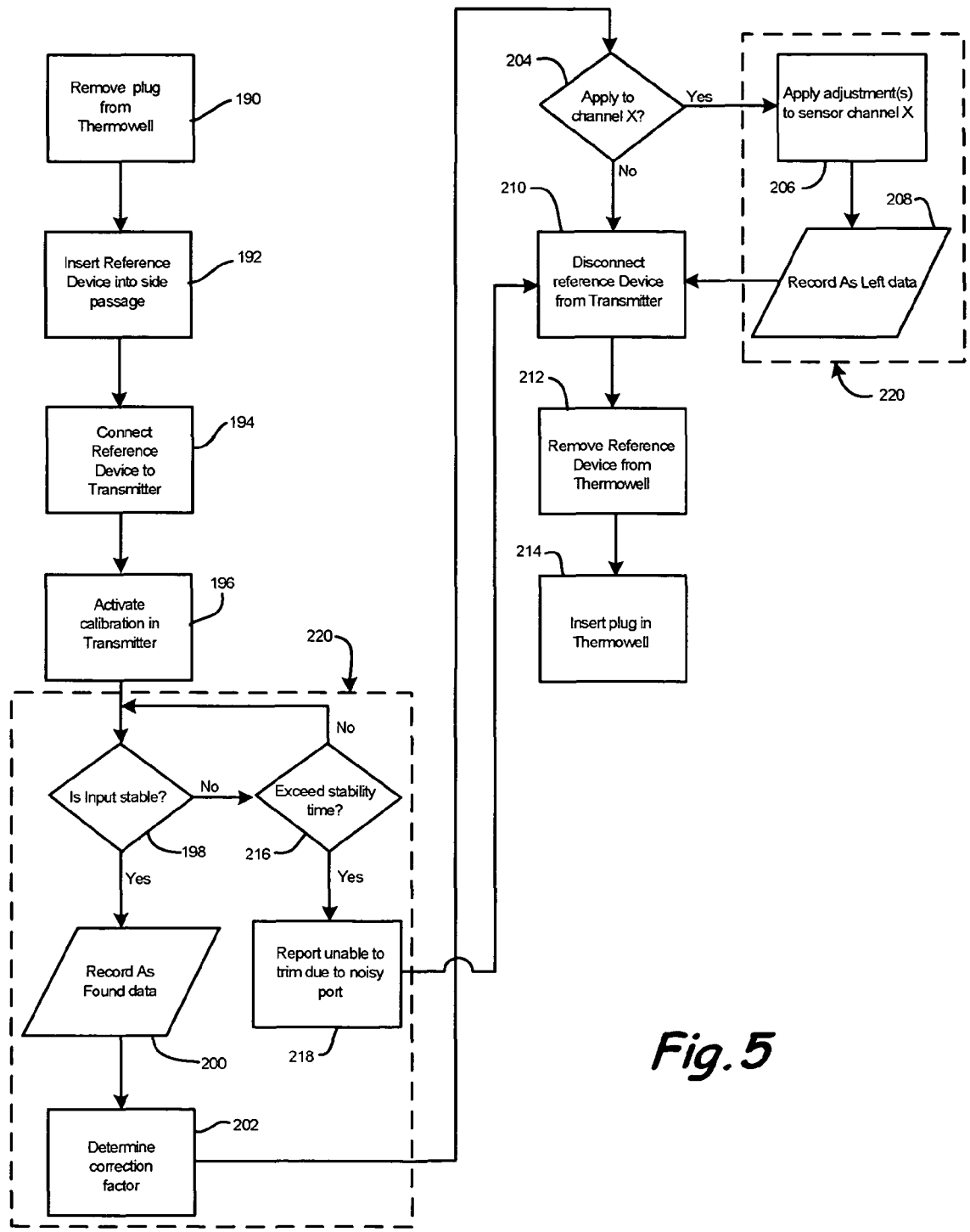
FIG. 5 is a flow chart of a third method of calibrating a temperature measurement point.

FIG. 5 is a flow chart of a third method of calibrating temperature measurement point 10. Prior to beginning the third method, reference device 16 would not yet be in thermowell 40 as depicted in FIG. 2. Instead, plug 76 would be plugging side passage 70. First temperature sensor 12 could already be inserted into thermowell 40 as depicted in FIG. 2 and transmitter 18 could be measuring temperature of a process as described with respect to FIG. 1. If first temperature sensor 12 is not already inserted into thermowell 40, it should be done in advance of step 198.

Upon starting the third method, plug 76 is removed from side passage 70 (step 190). Then reference device 16 is inserted into side passage 70 until reference RTD 80 is approximately adjacent to first RTD 78 (step 192). In the third method, reference device 16 is a calibrated temperature sensor, such as an RTD. Next, reference device 16 is connected to third terminal 24 (step 194). Calibration mode is then activated in transmitter 18 through a user interface so that transmitter 18 is aware that third channel 30 will be providing calibration data (step 196). Transmitter 18 then checks to see if input is stable (step 198). If input is stable, then transmitter 18 measures resistance of each of first temperature sensor 12 and reference device 16, calculates temperature values of each, and records data for a current state of calibration as "As Found" data (step 200). Transmitter 18 then determines a correction factor based upon the difference in temperature measured by each of first temperature sensor 12 and reference device 16 (step 202). Next the operator decides whether to calibrate first channel 26 according to the correction factor determined for first temperature sensor 12 (step 204). If the operator determines that the calibration is appropriate, such calibration is applied (step 206) and transmitter 18 records data for a current state of calibration as "As Left" data (step 208). Then, reference device 16 is disconnected from third terminal 24 (step 210). Step 210 occurs immediately after step 204 if the operator decides not to apply calibration to first channel 26. Reference device 16 is then removed from thermowell 40 (step 212). Finally, plug 76 is reinserted into side passage 70 (step 214).

In certain circumstances, input from reference device 16 may not be stable. If it is determined that input is not stable at step 198, then transmitter 18 checks to see if a stability time limit has been exceeded (step 216). If the stability time limit has not been exceeded, step 198 is repeated. If the stability time limit has been exceeded, transmitter 18 then reports that it is unable to perform a trim due to noisy input (step 218) and reference device 16 is disconnected from third terminal 24 at step 210. Transmitter step group 220 includes those steps that are performed by circuitry inside transmitter 18.

Calibration according to the third method allows the operator to calibrate transmitter 18 to compensate for drift of first temperature sensor 12 without disconnecting first temperature sensor 12 from transmitter 18 and without removing temperature sensor 12 from thermowell 40. The third method can be repeated for second temperature sensor 14 and any other sensor connected to transmitter 18. This allows for continued measurement of the process by measurement channels during calibration.

Figure 6:
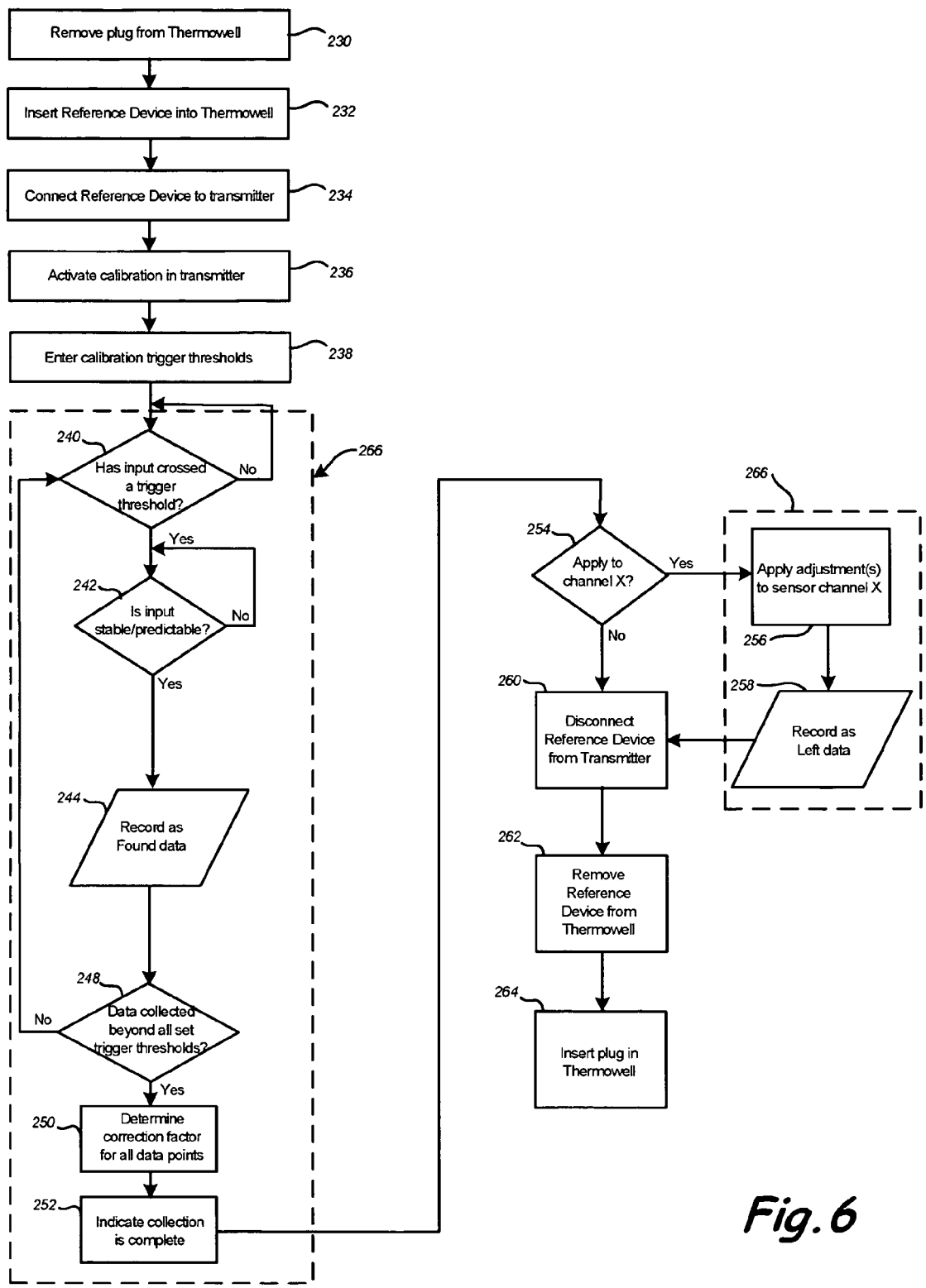
FIG. 6 is a flow chart of a fourth method of calibrating a temperature measurement point.

FIG. 6 is a flow chart of a fourth method of calibrating temperature measurement point 10. Prior to beginning the fourth method, reference device 16 would not yet be in thermowell 40 as depicted in FIG. 2. Instead, plug 76 would be plugging side passage 70. First temperature sensor 12 could already be inserted into thermowell 40 as depicted in FIG. 2 and transmitter 18 could be measuring temperature of a process as described with respect to FIG. 1. If first temperature sensor 12 is not already inserted into thermowell 40, it should be done in advance of step 242.

Upon starting the fourth method, plug 76 is removed from side passage 70 (step 230). Then reference device 16 is inserted into side passage 70 until reference RTD 80 is approximately adjacent to first RTD 78 (step 232). In the fourth method, reference device 16 is a calibrated temperature sensor, such as an RTD. Next, reference device 16 is connected to third terminal 24 (step 234). Calibration mode is then activated in transmitter 18 through a user interface so that transmitter 18 is aware that third channel 30 will be providing calibration data (step 236). Calibration trigger thresholds are then entered via the user interface (step 238). Calibration trigger thresholds can include one or more temperature values where calibration is desired. For example, an operator could chose an upper threshold and a lower threshold and ask transmitter 18 to calibrate once when temperature is above the upper threshold and another time when temperature is below the lower threshold.

Once calibration trigger thresholds are entered, transmitter 18 checks to see if temperature measured by reference device 16 exceeds a calibration trigger threshold (step 240). If a calibration trigger threshold is not exceeded, step 240 is repeated until it is exceeded. If a calibration trigger threshold is exceeded, then transmitter 18 checks to see if input is stable or has a predictable trend (step 242). If input is not stable or predictable, step 242 is repeated until input is stable or predictable. If input is stable or predictable, then transmitter 18 measures resistance of each of first temperature sensor 12 and reference device 16, calculates temperature values of each, and records data for a current state of calibration as "As Found" data (step 244). Then transmitter 18 checks to see if data has been collected beyond all set calibration trigger thresholds (step 248). If one or more calibration trigger thresholds have been set but not all data has been collected past all set thresholds, steps 240 through 248 are then repeated. If all calibration trigger thresholds are satisfied, transmitter 18 then determines a correction factor based upon the difference in temperature measured by each of first temperature sensor 12 and reference device 16 (step 250). Depending on how many trigger thresholds are used for calibration, the correction factor may be not merely a constant value but a polynomial equation instead. Temperature sensor 12 can be assigned a characterized profile based upon the polynomial equation that is programmed into transmitter 18 to reduce accuracy errors.

The user interface then indicates that data collection is complete (step 252), and the operator decides whether to calibrate first channel 26 according to the correction factor determined for first temperature sensor 12 (step 254). If the operator determines that the calibration is appropriate, such calibration is applied (step 256) and transmitter 18 records data for a current state of calibration as "As Left" data (step 258). Then, reference device 16 is disconnected from third terminal 24 (step 260). Step 260 occurs immediately after step 254 if the operator decides not to apply calibration to first channel 26. Reference device 16 is then removed from thermowell 40 (step 262). Finally, plug 76 is reinserted into side passage 70 (step 264). Transmitter step group 266 includes those steps that are performed by circuitry inside transmitter 18.

Calibration according to the fourth method allows the operator to calibrate transmitter 18 to compensate for drift of first temperature sensor 12 without disconnecting first temperature sensor 12 from transmitter 18 and without removing first temperature sensor 12 from thermowell 40. The fourth method is similar to the third method except the fourth method allows transmitter 18 to automatically initiate calibration at points past one or more thresholds. This method can be particularly useful for temperature sensors measuring a process with a variable temperature where accurate temperature measurements are desired in multiple temperature ranges. The fourth method can be repeated for second temperature sensor 14 and any other sensor connected to transmitter 18.

Figure 7:
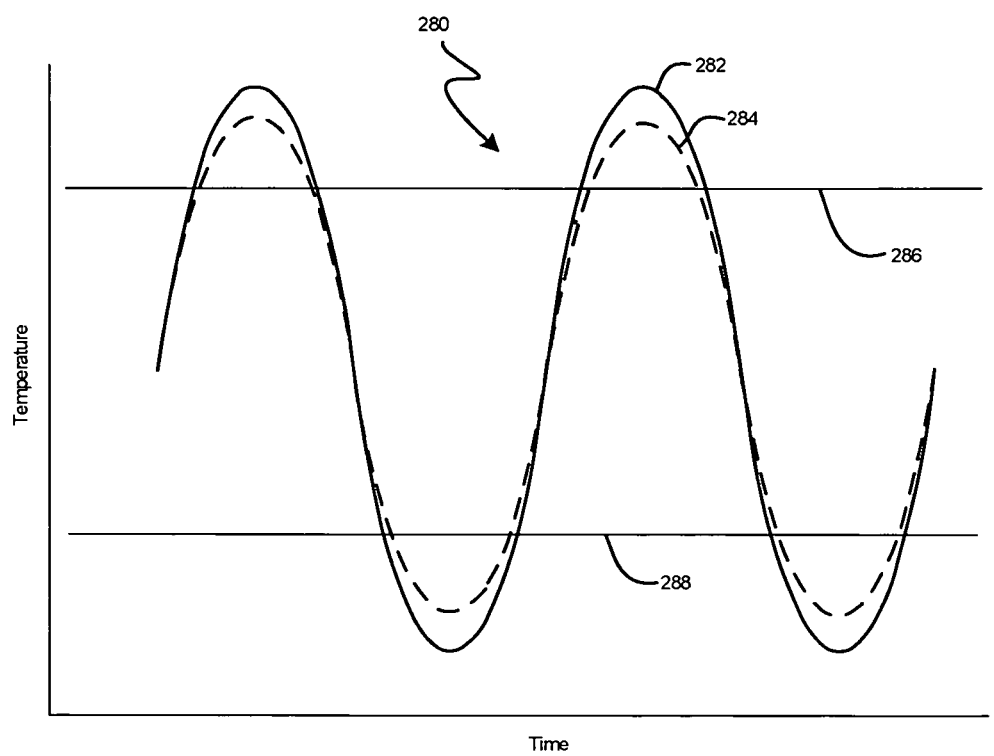
FIG. 7 is a graph of calibration limits according to the fourth method of calibrating a temperature measurement point.

FIG. 7 is threshold graph 280, which illustrates calibration threshold limits according to the fourth method of calibrating a temperature measurement point. Threshold graph 280 includes actual process temperature 282, measured process temperature 284, upper threshold 286 and lower threshold 288. Actual process temperature 282 represents temperature values of the process as measured by calibrated reference device 16, which is substantially accurately calibrated. Measured process temperature 284 represents temperature values of the process as inaccurately measured by first temperature sensor 12. Upper threshold 286 and lower threshold 288 are those threshold limits entered via the user interface, as explained with respect to step 238, above. When actual process temperature 282 is above upper threshold 286, measured process temperature 284 reads lower than actual process temperature 282. When actual process temperature 282 is below lower threshold 288, measured process temperature 284 reads higher than actual process temperature 282. Thus, first temperature sensor 12 requires calibration in different directions at different temperature ranges. Threshold graph 280, therefore, illustrates one example of a temperature measurement point that can benefit from calibration in more than one temperature range.

Although the present invention has been described with reference to particular embodiments, workers skilled in the art will recognize that changes may be made in form and detail without departing from the scope of the invention as claimed. For example, transmitter 18 and thermowell 40 may be used together or separately in manners other than the first, second, third, and fourth methods described above. Moreover, the first, second, third, and fourth methods described above may be performed with equipment other than transmitter 18 and thermowell 40 so long as the equipment is compatible with the chosen method. Additionally, steps of one method could be modified or combined with steps of another method without departing from the invention.

The invention claimed is:

1. A system for measuring temperature, the system comprising:
   a thermowell with a measurement instrument connection and a side port, wherein the side port is an exterior side port and wherein the thermowell comprises:
   a well comprising an exterior surface and an interior surface;
   a bore cavity defined by the interior surface, wherein the bore cavity extends from the measurement instrument connection at a proximal end of the well to a sealed tip at a distal end of the well;
   a connection portion located on the exterior surface between the proximal end and the distal end; and
   a side passage extending from the exterior side port on the exterior surface to an interior side port on the interior surface, wherein the interior side port is between the proximal end and the distal end, wherein the exterior side port is between the proximal end and the connection portion, and wherein the proximal end is nearer to the exterior side port than to the interior side port;
   a primary temperature sensor extending into the thermowell through the measurement instrument connection;
   a reference sensor extending into the thermowell through the side port; and
   a transmitter connected to each of the primary temperature sensor and the reference sensor, wherein the transmitter comprises circuitry for measuring temperature based upon signals received from the primary temperature sensor and for concurrently calibrating based upon signals received from the reference sensor.

2. The system of claim 1, wherein the connection portion comprises a flange.

3. The system of claim 1, wherein the connection portion comprises a threaded area on the exterior surface.

4. The system of claim 1, and further comprising:
   a threaded area on a portion of the interior surface at the proximal end.

5. The system of claim 1, and further comprising:
   a threaded area on a portion of the side passage near the exterior surface.

6. The system of claim 1, and further comprising:
   a plug positioned inside the side passage, wherein the plug has a shape and size configured to provide a substantially water tight seal through the side passage.

7. The system of claim 1, wherein the side passage is a cylindrical hole, at least 0.5 millimeter in diameter.

8. The system of claim 1, wherein the bore cavity is a substantially straight passage and wherein the side passage is a substantially straight passage connected to the bore cavity and angled with respect to the bore cavity with an angle greater than 0 degrees and less than 90 degrees.

* * * * *